United States Patent
Anjum

(10) Patent No.: US 12,131,967 B2
(45) Date of Patent: Oct. 29, 2024

(54) ELECTRONIC DEVICE PACKAGE WITH BOARD LEVEL RELIABILITY

(71) Applicant: Texas Instruments Incorporated, Dallas, TX (US)

(72) Inventor: Naweed Anjum, Murphy, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 912 days.

(21) Appl. No.: 16/725,738

(22) Filed: Dec. 23, 2019

(65) Prior Publication Data

US 2020/0227328 A1  Jul. 16, 2020

Related U.S. Application Data

(60) Provisional application No. 62/791,468, filed on Jan. 11, 2019.

(51) Int. Cl.
| | |
|---|---|
| *G06F 30/30* | (2020.01) |
| *G01R 31/28* | (2006.01) |
| *G06F 30/367* | (2020.01) |
| *H01L 21/66* | (2006.01) |
| *G06F 113/18* | (2020.01) |
| *G06F 119/02* | (2020.01) |
| *G06F 119/18* | (2020.01) |

(52) U.S. Cl.
CPC .......... *H01L 22/34* (2013.01); *G01R 31/2853* (2013.01); *G01R 31/2856* (2013.01); *G01R 31/2896* (2013.01); *G06F 30/367* (2020.01); *H01L 22/32* (2013.01); *G06F 2113/18* (2020.01); *G06F 2119/02* (2020.01); *G06F 2119/18* (2020.01)

(58) Field of Classification Search
CPC ......... H01L 22/34; H01L 22/32; H01L 22/30; H01L 22/20; G01R 31/2853; G01R 31/2856; G01R 31/2896; G01R 31/2855; G06F 30/367; G06F 2113/18; G06F 2119/02; G06F 2119/18; G06F 30/398
See application file for complete search history.

(56) References Cited

U.S. PATENT DOCUMENTS

| | | | | |
|---|---|---|---|---|
| 6,894,524 B1 * | 5/2005 | Grilletto | ............ | G01R 31/2879 324/754.02 |
| 9,476,936 B1 * | 10/2016 | Johnson | ............. | G01R 31/2874 |
| 11,073,550 B1 * | 7/2021 | Gong | ................. | G01R 31/2896 |
| 11,099,229 B2 * | 8/2021 | Sunder | ............... | G01R 31/2853 |
| 2005/0242356 A1 * | 11/2005 | Catalasan | ............... | H01L 24/09 257/86 |

* cited by examiner

*Primary Examiner* — Jack Chiang
*Assistant Examiner* — Brandon Bowers
(74) *Attorney, Agent, or Firm* — Ronald O. Neerings; Frank D. Cimino

(57) ABSTRACT

In a described example, a method includes: providing a product package for a product die; building a product mimic die that mimics the product die and which is configured to make the product package functional for use in reliability testing; packaging the product mimic die in the product package to form a packaged product mimic die; reliability testing the packaged product mimic die; responsive to the reliability testing, revising the product package; and repeating the steps of reliability testing and revising the product package until the product package passes the reliability tests.

24 Claims, 13 Drawing Sheets

ELECTRONIC DEVICE PACKAGE WITH BOARD LEVEL RELIABILITY

CROSS REFERENCE TO RELATED APPLICATIONS

This application claims the benefit of priority under 35 U.S.C. § 119(e) to U.S. Provisional Patent Application Ser. No. 62/791,468 filed on Jan. 11, 2019, which application is hereby incorporated by reference herein in its entirety.

TECHNICAL FIELD

This disclosure relates generally to packaged electronic devices, and more particularly to methods for developing packages for electronic devices with board level reliability.

BACKGROUND

After a semiconductor device wafer is manufactured in a wafer fab, the wafer is diced into individual semiconductor device product dies. These product dies are mounted on a package substrate such as a lead frame, premolded lead frame, molded interconnect substrate (MIS), printed circuit board or laminate. The product dies and at least portions of the package substrate are then encapsulated with molding compound to form a packaged product die. The packaged product die has a protective body with exposed terminals for making electrical and physical connections to the product die within the package. Burn-in circuit boards are then populated with these packaged product dies and subjected to stressful conditions while operating for extended periods of time during board level reliability testing (BLR). Stressful conditions include high voltages, high temperatures, high humidity, high power, low temperature, temperature cycling between high and low temperatures, humidity cycling between high and low humidity, and voltage cycling between high and low voltages. The packaged semiconductor device product dies have to pass the burn-in reliability testing in order to qualify for sale to customers.

Packaged semiconductor product dies may fail BLR testing for a variety of reasons. Performance of the semiconductor device may fail a specification at one of the stress conditions. The performance of the semiconductor device may degrade under stress over time and may eventually fail specification. As a result of repeated stress cycling, a solder joint may fail or delamination may occur in the semiconductor device product package. When a packaged product die fails BLR testing, changes are made to the manufacturing flow of the product die and/or to the manufacturing flow of the product die package to fix the problem. BLR testing is then repeated until the packaged semiconductor device product die is qualified for sale.

SUMMARY

In a described example, a method includes: providing a product package for a product die; building a product mimic die that mimics the product die and which is configured to make the product package functional for use in reliability testing; packaging the product mimic die in the product package to form a packaged product mimic die; reliability testing the packaged product mimic die; responsive to the reliability testing, revising the product package; and repeating the steps of reliability testing and revising the product package until the product package passes the reliability tests. An example apparatus is also described.

DETAILED DESCRIPTION

Figure 1A:
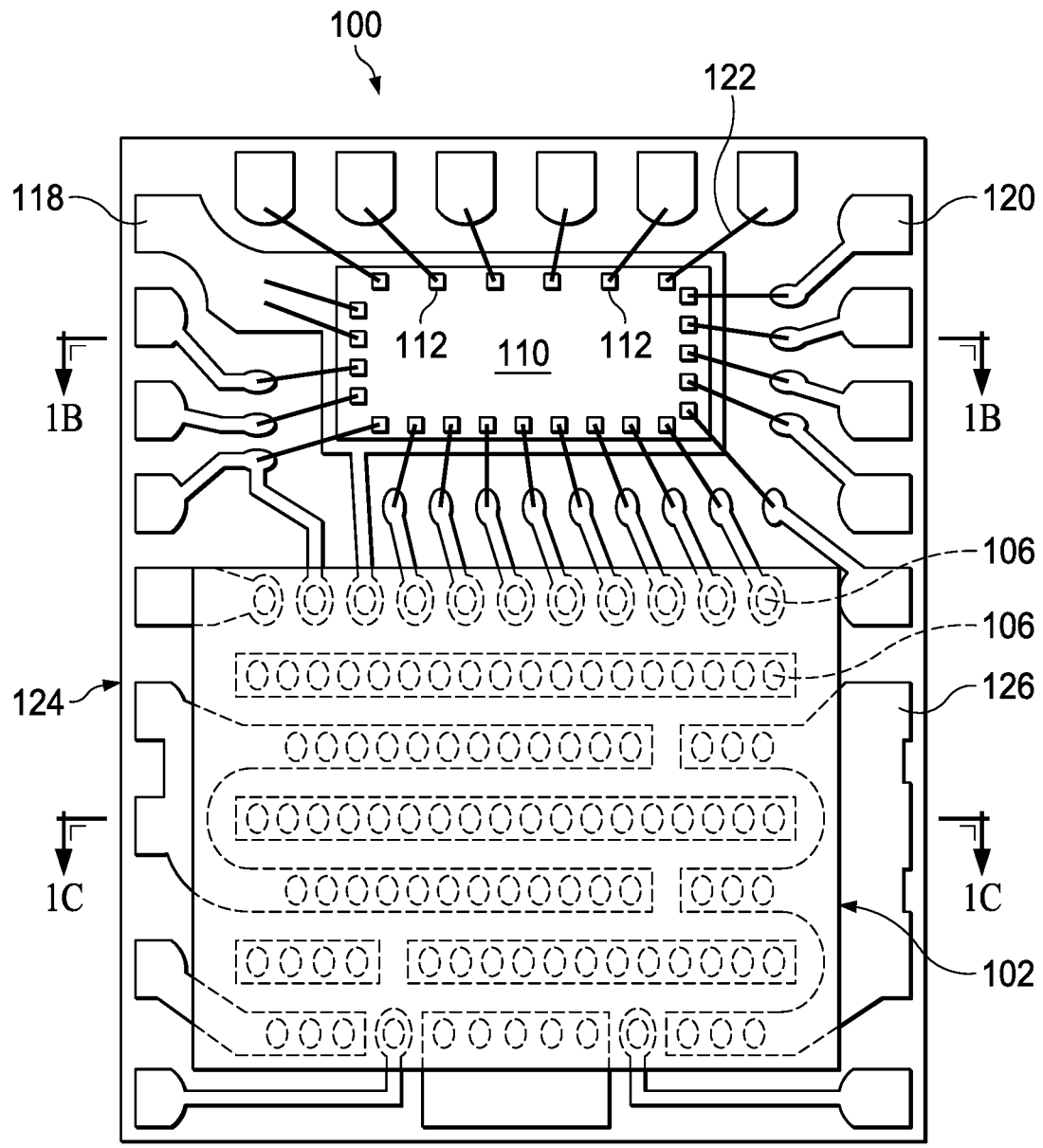
FIG. 1A is a plan view and FIGS. 1B and 1C are cross sectional views of packaged product dies in a package.

Corresponding numerals and symbols in the different figures generally refer to corresponding parts, unless otherwise indicated. The figures are not necessarily drawn to scale.

The term "electronic device package" is used herein. An "electronic device package" is a protective package that provides a package substrate for mounting one or more devices, such as semiconductor devices, passive devices such as capacitors, resistors, inductors, coils and transformers, sensor devices, couplers such as opto-couplers, or micro-electromechanical systems ("MEMS") devices. The electronic device package further includes terminals or leads located at an exterior surface to provide electrical connection to the devices mounted within the electronic device package, the terminals also provide mechanical mounting points for the electronic device package. In alternative arrangements, the terminals can be leads extending from the body of the electronic device package.

The term "package substrate" is used herein. A package substrate is a component used in mounting and packaging a semiconductor die. Examples shown in the figures herein show a lead frame as the package substrate. Other package substrates useful with the arrangements include pre-molded lead frames (PMLF). In addition, useful package substrates for the arrangements include conductive lead frames, partially etched or half-etched conductive lead frames, and molded interconnect substrates (MIS). The package substrate can be a film, laminate or tape that carries conductors, or can be a printed circuit board such as reinforced fiber glass (FR4), bismaleimide triazine (BT) resin, alumina, silicon carbide, or aluminum nitride. The materials for the package substrate can include conductors such as copper and copper alloys, iron-nickel alloys such as Alloy 42, and gold and gold alloys. Gold, silver, palladium, nickel and tin platings can be made on the metal conductors. These platings improve solderability, bondability, reduce diffusion and reduce possible corrosion. The package substrates can include dielectrics including silicon, glass, mold compound, ceramic, polyimide, fiberglass, and resins. Multiple levels of conductors spaced from one another by dielectric layers and conductive vias forming conductive connections between the multiple conductor levels can be used in the package substrates.

The term "conductive post connect" is used herein. As used herein, a conductive post connect is a structure made of a conductive material, for example copper, and provides a vertical electrical connection between a die and a package substrate. A package substrate, such as a lead frame, will have a conductive portion arranged to electrically and mechanically connect to the conductive post connect. The conductive post connect can have a variety of shapes, and can extend along the same direction as the conductive lead, so that it appears as a rail or rectangle in a plan view. Solder will be formed at the end of the conductive post connect. A copper pillar bump is an example of a conductive post connect. The conductive post connect can also be a column, rectangle or rail shape, and can have an oval, round, square or rectangular cross section. In examples, the conductive post connects can be arranged in parallel with additional conductive post connects to provide a low resistance path between the product die and the package. The conductive post connects can also transfer thermal energy away from the product die to the package lead frame or other package substrate and out of the package.

A product die is a semiconductor device die. The semiconductor device can be a digital or analog transistor, a sensor, a digital or analog integrated circuit, a micro electromechanical system (MEMS) device, a high power transistor, a high power circuit, or other stand alone or integrated semiconductor device.

The term "board level reliability testing" or "BLR" testing is used herein. As used herein, board level reliability testing or BLR testing includes testing packaged devices mounted to a test board or apparatus under stress conditions to determine the reliability of the packaged device. The terms "high power die" and "high power device" are used herein. A "high power die" is a die that includes at least one transistor configured to deliver current from a source to a load. A high power device can include a transistor or other devices that are designed to deliver current from a source to a load, and can include a high power die. Examples include power FET devices such as a GaN (gallium nitride) FET (field effect transistor) or "GaN-FET" from Texas Instruments, Incorporated. GaN-FET devices are used in power supply applications, for example, in switching power converter circuitry. Some vertical channel MOSFET power devices available from Texas Instruments Incorporated are referred to as NexFET™ devices, which are also examples of high power devices. The term "burn-in board" is used herein. A burn-in board is a printed circuit board that receives a packaged device for making connections used in testing. In example arrangements, a packaged device is mounted to a burn-in board for BLR testing. The burn-in board provides connections between portions of a lead frame in the package and the reliability tester. In some arrangements daisy chain testing is performed using connections on the burn-in board to portions of the packaged device to form series connections. Other connections to the mimic product package can also be made using the burn-in board during BLR testing.

The term "product mimic die" is used herein. A product mimic die is a die with essentially the same size and shape as the product die. In the arrangements, a product mimic die "mimics" the product die and is used to functionalize a product die package, so that the product die package can be BLR tested and debugged in parallel with and prior to or contemporaneous with the completion of the product die development. In the arrangements, the product mimic die is mounted in the proposed product die package in a manner identical to how the product die is to be mounted, to form a "mimic product package." In example arrangements, the product mimic die will be packaged and BLR tested before development of the product die is complete. The product mimic die enables the package intended for the product die to be debugged in parallel with product die development. The product mimic die method of example arrangements assures the packaged product die will quickly pass BLR testing, very possibly the first time the BLR testing is performed, saving time and redesign efforts that would otherwise delay time to market and increase costs.

In the arrangements, the problem of providing a product die package that will pass BLR testing of a product die in development is solved by using product mimic dies that mimic the size, shape and connections of the product die to develop and validate a proposed product die package in parallel with the product die development and manufacture. The package is tested by using the product mimic dies in the proposed package, and performing BLR testing on the proposed package with product mimic dies. When the packaged product mimic dies and the proposed package for the product dies pass the BLR testing, the proposed package design is complete and is then ready for the product dies prior to (or contemporaneously with) the completion of the product dies in development. Use of the arrangements results in reducing or eliminating the need for redesign of the product die package or revisions to the product die, or both, shortening time to market and reducing product costs.

In example arrangements, a product mimic die or multiple product mimic dies are used to develop and debug multi-die product packages. Multiple product mimic dies are designed, packaged in a mimic multi-die product package, and BLR tested. In another example arrangement, a single product mimic die can be used to debug a single die product package in parallel with development of the single die product design and manufacturing flow. Product mimic dies are especially useful for debugging high power die product packages. In high power die product packages, amperes of current running through the solder joints between the high power die and the package substrate can generate excessive current stress and heat, causing solder joints to fail. On packaged high power die products, multiple parallel conductive post connects often couple the high power die to the package substrate and distribute the power and distribute the generated heat. In the arrangements, the conductive post connects that are connected in parallel in the high power die can be wired in series (daisy chained) in the product mimic die and can then be stressed with high current to expose the weakest link of the conductive post connects. Changes can be made to the die product package and/or to the conductive post connect placement in the product die design during device development to ensure the packaged die product will pass BLR. The use of the daisy chain connections in mimic dies used in the arrangements provides the ability to identify a failure in conductive post connects that would not be possible or cannot be easily done in the product die. When these conductive post connections are made in parallel (in the product die), a single failure of a conductive post connect cannot be isolated.

FIG. 1A is a plan view of a multi-die product package 100. Two semiconductor device (product) dies, 102 and 110, are mounted on a package substrate. In this example, the package substrate is a lead frame (see 114 in FIGS. 1B, 1C and 214 in FIG. 2A) covered with mold compound 124 to form this multi-die product package 100. In this example, one of the product dies 110 is mounted on a die mount pad 118. Bond pads 112 on the product die 110 are electrically connected to die mount pad 118, and to leads 120, with wire bonds 122. The other product die 102 is connected to conductive leads 126 (extended leads) on the lead frame 114 with multiple conductive post connects 106. For example, product die 110 can be a logic device die and product die 102 can be a high power product die. These conductive post connects 106 are also referred to herein as Hot Rod™ connects. A Hot Rod™ package supplied by Texas Instruments Incorporated includes extended conductive leads that extend across a portion or sometimes across an entire width of the lead frame in the package. These extended conductive leads 126 can be arranged for parallel conductive post connects to a product die, such as a high power integrated circuit. The Hot Rod™ package also includes externally exposed surfaces on portions of at least some of these extended conductive leads 126. The extended conductive leads 126 can be arranged for efficient thermal transfer by mounting these exposed surfaces to a thermal pad on a system board. These extended conductive leads 126 are also arranged for providing low resistance to enhance performance of the packaged power device. These extended conductive leads 126 can carry power and ground voltages to the semiconductor dies, for example. In this example, multiple conductive post connects 106 from the high-power electronic device die 102 are connected in parallel to the extended conductive leads 126 on the lead frame to distribute power. Many other package configurations are useful with the arrangements with one or several high-power semiconductor dies 102 mounted on the lead frame using conductive post connects 106. In addition, other high-power product package 100 configurations with one or several logic dies 110 in addition to high-power electronic device dies 102 are possible.

Figure 1B:
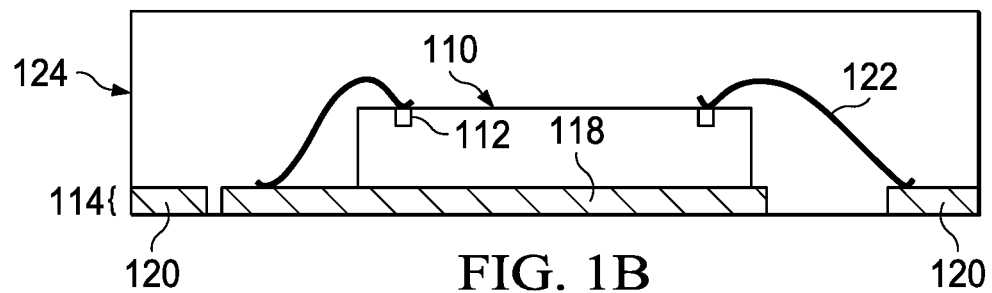

FIG. 1B shows a cross sectional view of product package 100 in FIG. 1A taken along cut line 1B-1B in FIG. 1A through the product die 110. Reference labels in FIG. 1B are the same as reference labels in FIG. 1A. As seen in the cross sections, the example package is a quad flat no-lead (QFN) package with a lead frame 114 and with exposed portions of the lead frame leads 120, which have exterior surfaces coextensive with the exterior surfaces of the package body of mold compound 124. The exposed portions of the lead frame leads serve as terminals for the packaged device. Because the exposed portions of the lead frame leads do not extend from the surface of the package body, the package is referred to as a "no-lead" package. Packages with terminals formed on one or two sides are also used, these can be referred to as "small outline no-lead" or "SON" packages to distinguish these packages from QFN packages.

Figure 1C:
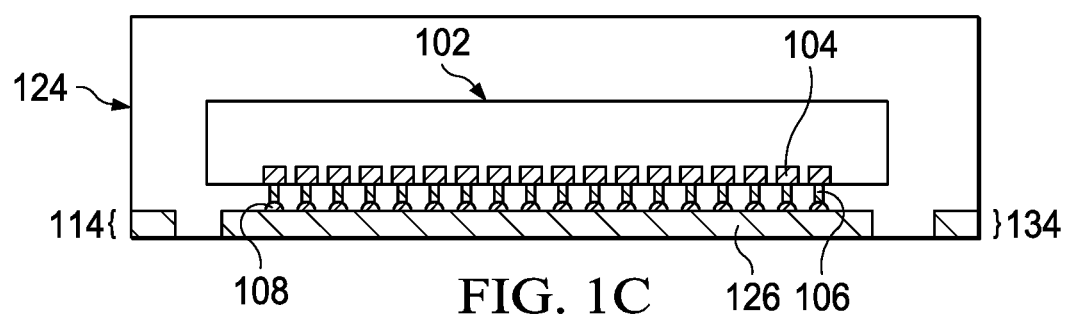

FIG. 1C shows a cross sectional view of the product package 100 in FIG. 1A taken along cut line 1C-1C in FIG. 1A through product die 102. Reference labels in FIG. 1C are the same as reference labels in FIG. 1A for the same elements. The cross sectional view shows multiple conductive post connections 106 forming parallel electrical connects between the bond pads 104 on product die 102 and the extended conductive lead 126 on the lead frame 114. In FIG. 1C a row 134 on the lead frame 114 for receiving a corresponding row of the conductive post connects is shown. Conductive post connects 106 are used in the example arrangements. Other types of connections can be used between product dies and package substrates in the product die packages. Note that while the conductive post connects 106 are shown as approximately uniform in size and shape in this example, in alternatives the size and shape for different conductive post connects 106 can vary. For example, oval posts, square posts or rectangular posts can be used. The conductive post connects can be larger diameter in some positions, and smaller in others, as needed for a particular package application. The product die 102, the multiple conductive post connections 106, the extended conductive leads 126 of the lead frame 114 are covered with mold compound 124 to form the packaged product 100. Surfaces of portions of the lead frame 114 opposite the side on which the product dies 110 and 102 are mounted remain exposed, these surfaces enable the packaged product 100 to be mounted to conductive leads on a system substrate such as a printed circuit board. Surface mounting can be used with solder to mount the packaged product 100 to a system printed circuit board.

FIGS. 2A-2E additionally illustrate the components in a high-power product package similar to package 100 shown in FIGS. 1A-1C. In FIGS. 2A-2E similar reference labels are used for similar elements as are shown in FIG. 1A-1C, for clarity. For example, lead frame 214 in FIG. 2A corresponds to lead frame 114 in FIGS. 1B-1C, logic device die 210 in FIGS. 2B and 2C corresponds to product die 110 in FIG. 1B, and high-power device die 202 in FIGS. 2D and 2E corresponds to product die 102 in FIG. 1C.

Figure 2A:
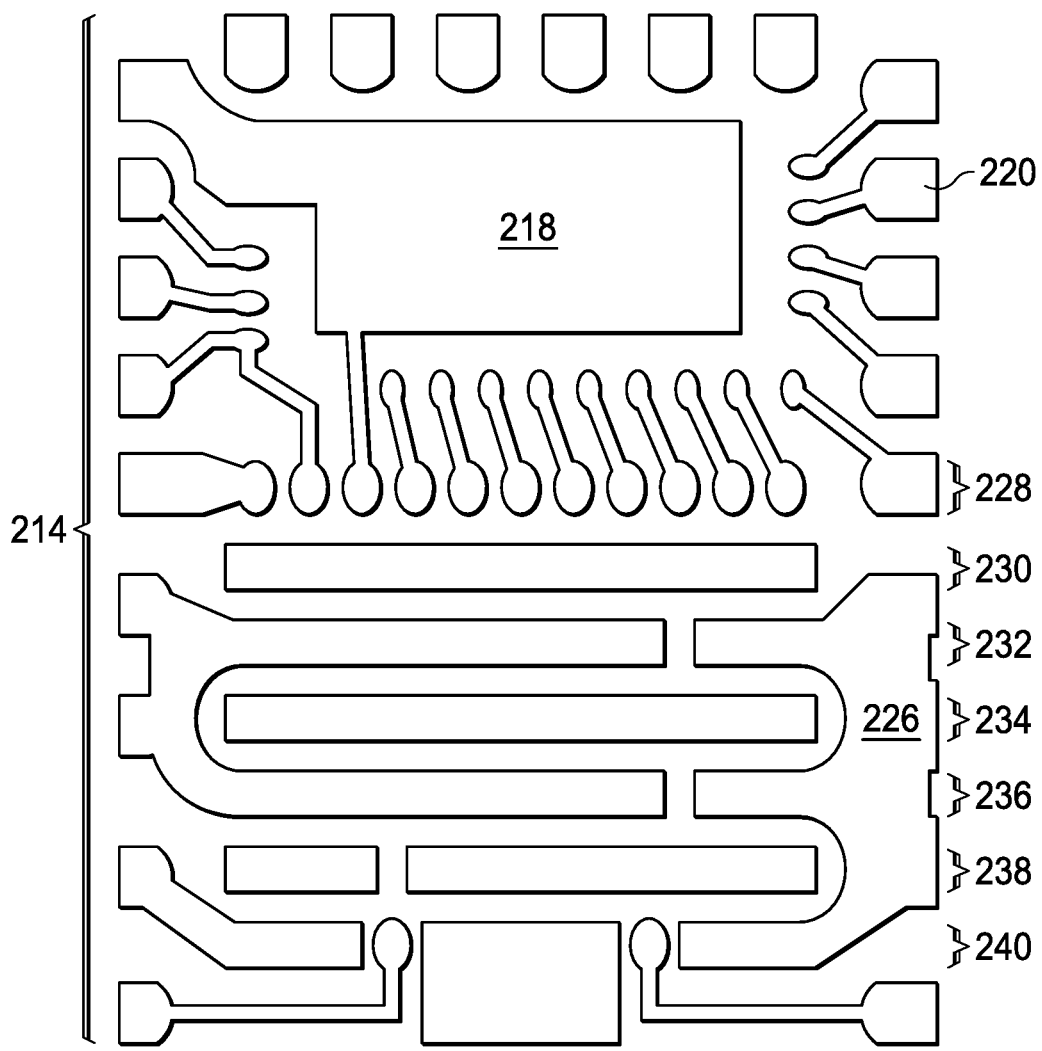
FIG. 2A is a plan view of a lead frame for packaged product dies.

FIG. 2A is a plan view of the lead frame 214, which is the package substrate for this example. Lead frame die mount pad 218 will receive a logic die 210 (see FIG. 2B for a plan view of the logic die 210 and bond pads 212) and as shown in a cross section in FIG. 2C. In the arrangement bond pads 212 on logic device die 210 (see FIG. 2C) will be connected to lead frame die mount pad 218 and leads 220 with wire bonds (such as illustrated for logic die 110 in FIG. 1B.) In an alternative arrangement, flip chip mounting can be used. In flip chip mounting, the logic die 210 is positioned so that the bond pads 212 face the lead frame. Solder bumps, copper pillar bumps, copper bumps or solder balls can be used to mount and electrically connect the die 210 to the lead frame 214. The arrangements can be used with other packages with conductive post connects coupled to leads in a package. In FIG. 2A, the areas labeled 230, 232, 234, 236, 238 and 240 identify extended conductive leads on the lead frame 214 where rows of conductive post connects 206 (see FIG. 2D) will form solder connections to extended conductive leads such as extended conductive lead 226 (see FIG. 2D and rows 227, 229, 231, 233, 235, 237 and 239 of conductive post connects 206.)

Figure 2D:
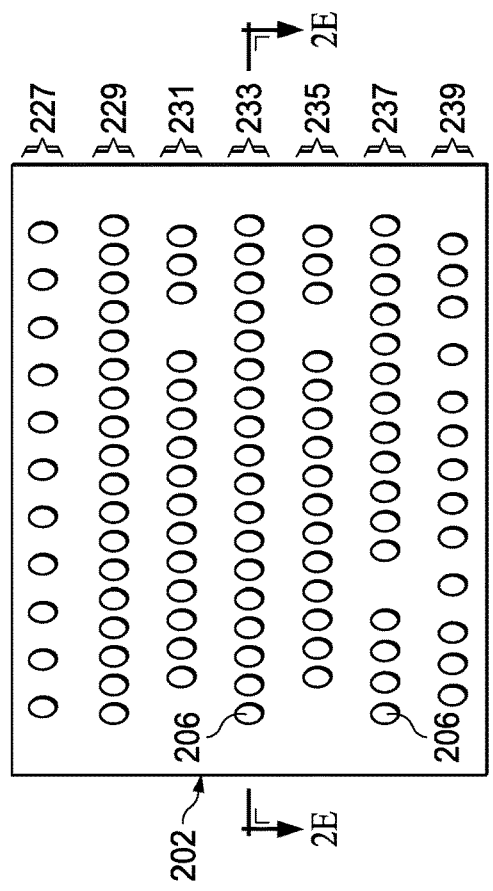
FIG. 2D is a plan view and FIG. 2E is a cross sectional view of another product die.

FIG. 2D shows a plan view of the conductive post connects, or Hot Rod™ connects, 206, on the mounting side of high-power product die 202. In this example high-power product die 202 has seven rows of multiple conductive post connects 206 in rows 227, 229, 231, 233, 235, 237, and 239. These seven rows of multiple conductive post connects 206 will be connected to six extended conductive leads 230, 232, 234, 236, 238, and 240 on lead frame 214 with solder bonds (see FIG. 2A). In the packaged product, the high power product die 202 often has conductive post connects 206 to the same extended conductive lead (for example, lead 230) of lead frame 214, with the conductive post connects 206 connected in parallel. The product die 202 may also have some conductive post connects 206 that are individually connected to a lead (for example, a lead 228 in FIG. 2A) on the lead frame 214 and that are not connected in parallel.

Figure 2E:
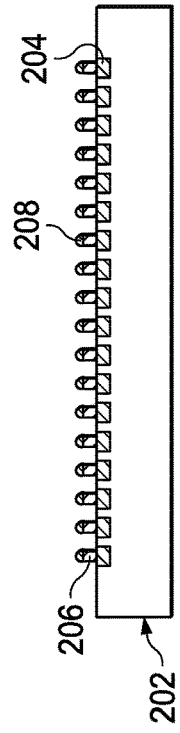
Figure 2B:
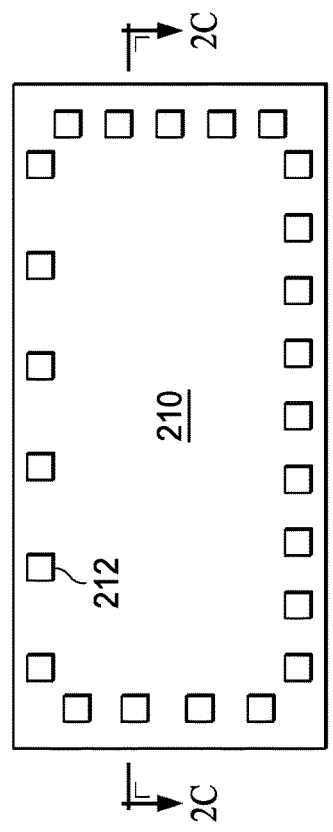
FIG. 2B is a plan view and FIG. 2C is a cross sectional view of a product die.
Figure 2C:
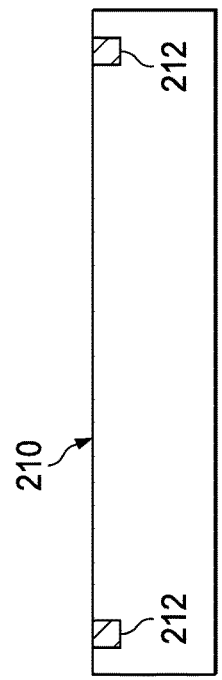

FIG. 2E is a cross section taken through one of the rows (see for example, 233 in FIG. 2D) of parallel multiple conductive post connects 206 taken along cut line 2E-2E (see FIG. 2D.) The conductive post connects 206 are formed on bond pads 204 on the high-power device die 202. The conductive post connects 206 are a post, column or rail with an end capped with solder 208. When the high-power device die 202 is flip chip mounted on the lead frame 214, the solder 208 melts in a thermal reflow process to form solder bonds between the conductive post connects 206 and the lead frame 214. Each row of conductive post connects 206 on the high-power device die 202 is soldered to an extended conductive lead 226 on the lead frame 214. Conductive post connect row 229 is soldered to lead frame extended conductive lead 230 on the lead frame 214. Likewise, conductive post connect row 231 is soldered to extended conductive lead 232, 233 to 234, 235 to 236, 237 to 238 and conductive post connect row 239 is soldered to extended conductive lead 240.

For a packaged device (see FIG. 1A, 100) to pass board level reliability (BLR) testing, the operating temperature within the packaged device 100 must not exceed specifications. Packages which contain a device die such as a high power product die must be designed to conduct heat away from the high-power product die to prevent the packaged high-power product die from exceeding temperature specifications, possibly resulting in failure of one or more of the conductive post connects. In order to meet these specifications, the package for a high power product die is designed to distribute the power generated by the high-power product die so that a hot spot does not form. One form of BLR testing is a "burn-in" test where the product die is operated for a time period and during the burn-in test the product die may be exposed to high and low temperature cycling and high and low power cycling, and high and low humidity cycling, for example, to simulate various operating conditions during the testing. The burn-in test stresses the product die with various conditions to provide a measure of the expected reliability of the product die in the field over the expected life of the product.

Referring to FIG. 1A, for example, when designing the product die 102 and the product die package 100 separately, putting the product die 102 and package 100 together for the first time without pretesting can result in a long delay in time to market for the packaged product and/or increased package expense. This is particularly true when the packaged product die does not pass board level reliability testing. If failures occur in the packaged devices during BLR testing, functional testing or otherwise, the package may have to be redesigned causing a significant delay to market, alternatively expensive cooling such as heat spreaders or cooling fans may have to be added to avoid package redesign and to minimize the delay to market. In a worst case scenario, the package 100 and the product die 102 may both have to be redesigned to fix the failure. This redesign process can negatively impact product schedule, cause loss of market share, cause delays in shipping and sales of the product, and increase costs.

A method of developing the product package in parallel with the design of the device die is described in a flow diagram in FIG. 7. Major steps of the method are illustrated in FIGS. 3A-3D, and in FIGS. 4, 5, 6, and 7. The methods of the arrangements have the advantage that design revisions can be made to both the product package and to the product die while both the packages and the devices are still under development. In the example methods and arrangements, the die connection layout and the package configuration can be co-optimized to improve current distribution from the die into and out of the package and to improve heat flow from the die out of the package. The time to market of the complete packaged device is significantly shortened by use of the methods. These methods can be applied to high power product die and to high power product packages, but can also be applied to other die types and to the corresponding packages.

In the method arrangements, product mimic die, which are designed to mimic the product die but without the full functionality of the product die, are used to make the product package functional. Use of the product mimic die in the proposed package enable the package to be BLR tested and qualified or debugged while the product die is still in development. The product mimic die provides electrical connections that match the electrical connections in the product die in type, location and size. Conductive post connects are used in the following arrangements but other electrical connections are also possible. For testing to be robust, the product mimic die must be substantially the same size, shape, and footprint as product die. Product mimic die must have substantially the same conductive post connect layout as the mimicked product die. In the method, the conductive post connects that have been identified as most susceptible to failure under burn-in or BLR testing are connected in series (daisy chained together), and then subjected to burn-in current stress. The product mimic die may have some functional circuitry, but in alternative arrangements the product mimic die may also be simplified to provide only the conductive post connects and the daisy chain connections, to make the product mimic die inexpensive to manufacture and to keep design time of the product mimic die short. Multiple daisy chain loops of conductive post connects can be designed into the product mimic die and can be tested in parallel. Series connection of the conductive post connects enables failure issues of a single conductive post to be easily identified. In contrast, in the parallel connections of conductive post connects in the product die, a single conductive post failure cannot be easily identified during testing of the packaged product die. If any issues are uncovered in BLR testing of the mimic product package, changes can be made to the product die package and/or changes can be made to the product die design or manufacturing flow before the product die devices are completely developed. Using these methods, a product package that is proven to be reliable is ready for the product die or product dies as soon as the product dies pass qualification. Use of these methods avoids costly delays in time to market and also avoids costly modifications to the product package that could otherwise be required to compensate for excessive heating. The methods are applicable, for example, to high power packaged dies; and also apply to other types of packaged dies or circuits. The methods are applicable, for example, to multi-die packages and to single-die packages.

The design of a product mimic die that enables pretesting and optimization of the product package (shown in FIGS. 1A-1C, for example) is shown in FIGS. 3A-3D, and FIGS. 4-6. The packaged device 100 in FIG. 1A has two product dies, 102 and 110, mounted on the lead frame. In an example, the first product die 102, which can be a high-power electronic device, is mounted on the lead frame using conductive post connects 106. The second product die 110, which can be a logic die, is mounted on a die mount pad 118 on the lead frame and connected to the lead frame die mount pad 118 and leads 120 with wire bonds 122. (Lead frame 114, see FIGS. 1B-1C, includes the die mount pad 118, the leads 120, and the extended conductive leads such as 126).

Figure 3A:
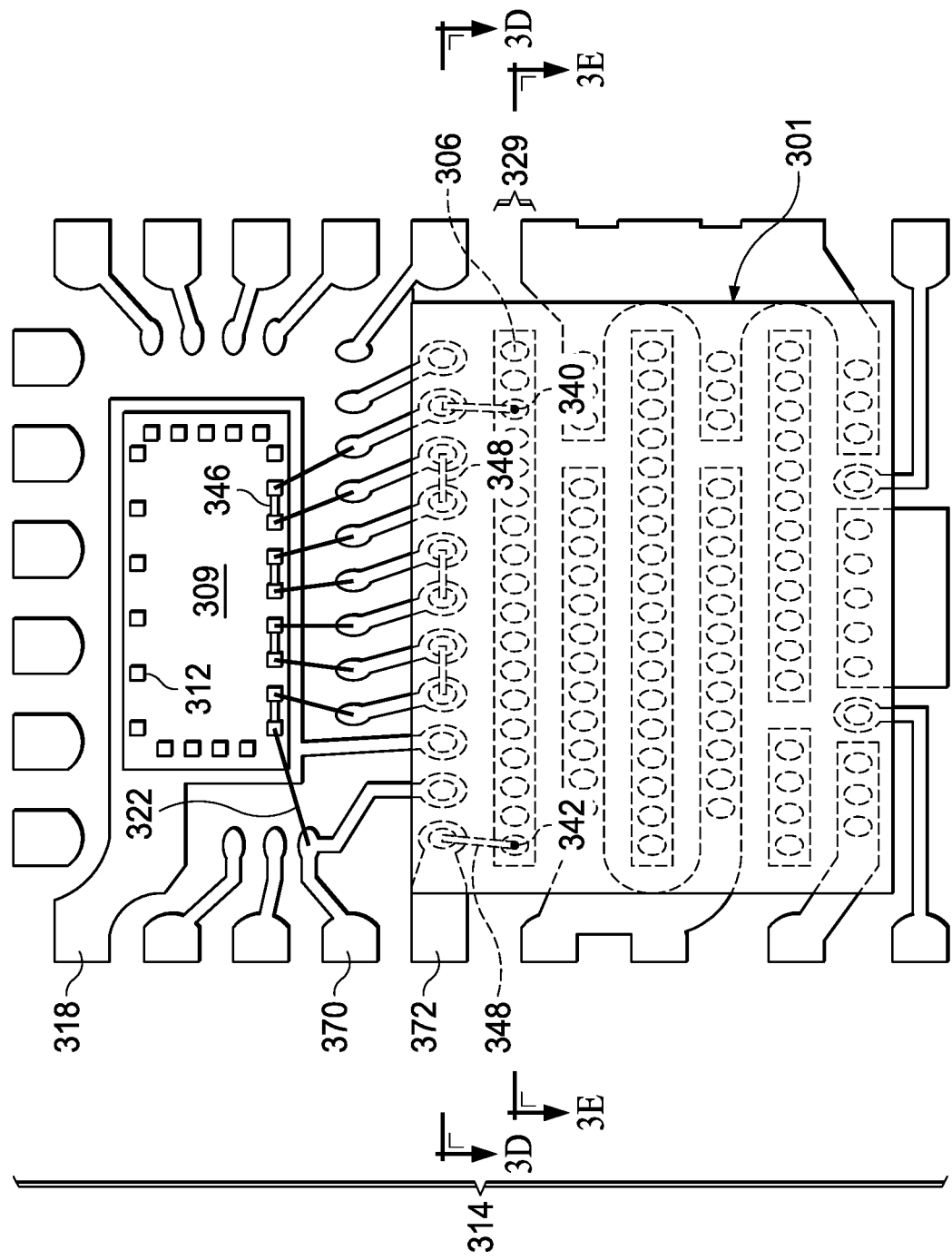
FIG. 3A is a plan view of product mimic dies mounted on a lead frame.
Figure 3D:
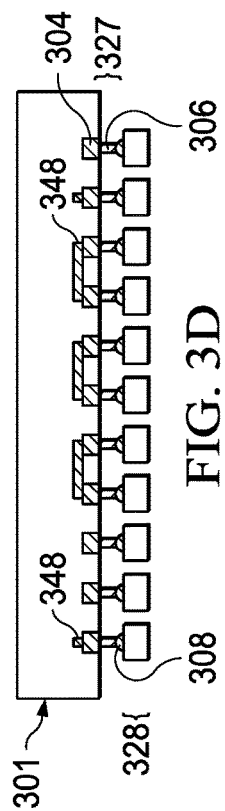
FIGS. 3D and 3E are cross sectional views of a product mimic die taken through first and second portions of a first daisy chain testing loop.

In FIG. 3A, first and second product mimic dies, 301 and 309, are designed to mimic the product dies 102, 110 in FIG. 1A and to enable one or more daisy chains of series connected conductive post connects to be board level reliability (BLR) tested in the product package. The product mimic dies 301 and 309 have identical conductive post connects and wire bonds as the mimicked product dies (102 and 110, or 202 and 210.) The product mimic dies 301 and 309 are designed to make the product package 100 (see FIG. 1A) functional. Use of the product mimic dies 301 and 309 in the product package enable BLR testing of the package and the conductive post connects prior to completion of development of the product dies 102 and 110.

As shown in FIG. 2D, the example product die 202 has 6 rows of multiple conductive post connects 206. The construction and placement of these 6 rows of multiple conductive post connects 206 is duplicated in the product mimic die 301 (FIG. 3A) to mimic the product die 102 (FIG. 1A) or to mimic product die 202 (FIG. 2D). In this example, selected ones of the conductive post connects 306 are daisy chained together in series to form two daisy chain testing loops. The daisy chain testing loops can include the series connected conductive post connects, a lead or leads on the lead frame, and/or bond wires and bond pads that are connected together in a conductive testing loop, as will be further illustrated below. Additional conductive structures such as shorting bars can be added to the mimic dies to form part of the conductive testing loops. Before designing the first product mimic die 301, a package level simulation is performed to determine which of the multiple conductive post connects 306 that are connected to leads on the lead frame 314 are most susceptible to failure due either to passing high current or due to excessive heating. In the example arrangements, at least these identified conductive post connects 306 are connected in series to form a daisy chain testing loop or to form several daisy chain testing loops. (Note that in the product die, these conductive post connects (see FIG. 1A, 106) are arranged in parallel and are not in a daisy chain for testing. The parallel arrangement makes testing and analysis of failed devices difficult, because a single open or partially open connection is impossible to identify when parallel conductive post connects are shorted to the same extended conductive lead. The remaining conductive post connects make the electrical connection in the product die even when an open or partial open exists in one or more of the conductive post connects). By arranging at least some conductive post connects in a series daisy chain in the product mimic die, the individual conductive post connections can be tested to easily identify a failing connection. In contrast, if a parallel conductive post connect is failing in the completed product package, it is difficult to identify which of a group of parallel conductive post connects is failing, as the remaining ones of the group continue to carry current and provide connection.

A first example daisy chain testing loop is illustrated in FIGS. 3A-3D. In FIGS. 3A-3D similar reference labels are used for similar elements as are shown in FIG. 1A-1C, for clarity. For example, lead frame 314 in FIG. 3A corresponds to lead frame 114 in FIG. 1B. Conductive post connects 340 and 342, in connect row 329, that were identified by package level simulation to be most likely to fail first, are connected together in series with other conductive post connects 306 to form a first daisy chain testing loop. This first daisy chain testing loop begins at a first selected lead frame lead 370 (selected from the lead frame leads 320) and terminates at a second selected lead frame lead 372. (See dashed line 671 in FIG. 6.) In the first product mimic test die 301, conductive post connects 306 in post connect row 327 (see 327 in FIG. 3D) are shorted together in series by post connect shorting bars 348 which with the bond wires 322 form a first portion of the first daisy chain testing loop. As is illustrated in a plan view in FIG. 3B and in a corresponding cross section in FIG. 3C, in the second product mimic test die 309, certain bond pads 312 are shorted together with bondpad shorting bars 346 to provide continuity for the series conductive post connects 306 in the first daisy chain testing loop. Included in the first daisy chain testing loop are certain individual conductive post connects 306 between the first product mimic die 301 and leads on lead frame 314 (these connect conductive post connects 306 in conductive post connect row 327 to individual leads in lead frame row 328, see the cross sectional view of mimic die 301 and lead frame row 328 in FIG. 3D). When individual conductive post connects 306 exist between a bond pad 304 on the product mimic die 301 and a lead frame lead 328 as in FIG. 3D (as opposed to multiple conductive post connects 306 connected in parallel as in FIG. 3E, see row 329 of post connects coupled to extended conductive lead 330 on the lead frame) it is important to include the individual conductive post connects 306 wired in series in a testing daisy chain loop to enable testing of package reliability.

Figure 3E:
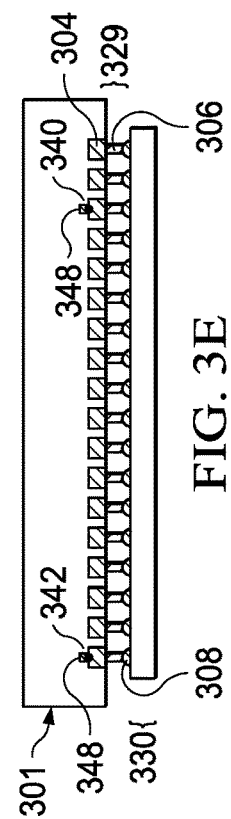
Figure 6:
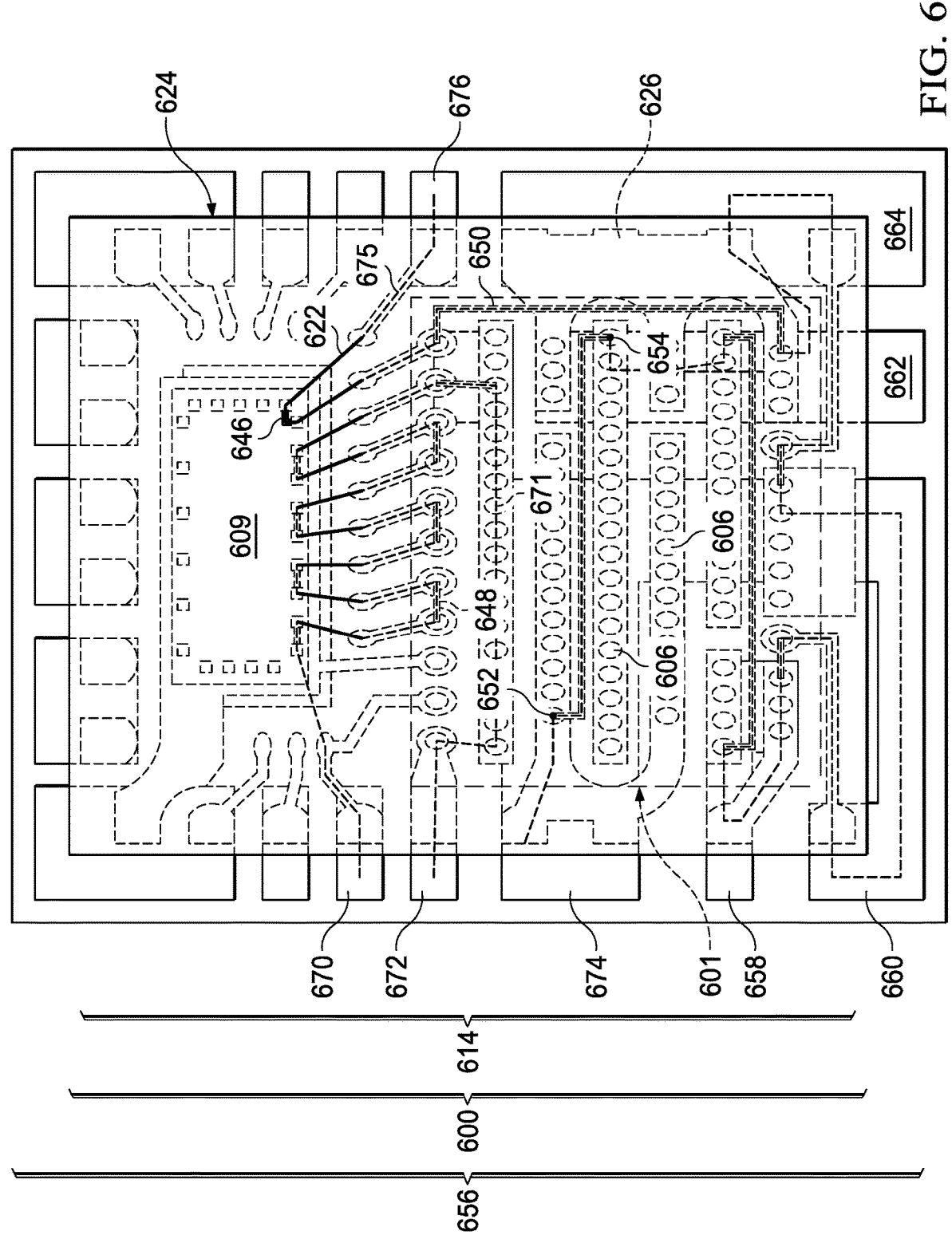
FIG. 6 is a plan view of a packaged product mimic die mounted on a burn-in board, showing the current paths through daisy chain testing loops.

FIG. 3E is a cross section of mimic die 301 taken along a row 329 of conductive post connects 306 between bond pads 304 and extended conductive lead 330 that is part of the first daisy chain testing loop (See 671, FIG. 6). In FIG. 3E, a post connect shorting bar 348 coupled to a post connect 342 and another post connect shorting bar 348 is coupled to a post connect 340 as shown in the cross section, these post shorting bars 348 couple the post connects 306 in row 329 to the first daisy chain testing loop, see these elements in the plan view in FIG. 3A. The conductive post connects 306 in row 329 are electrically coupled in parallel to the extended conductive lead frame lead 330 by solder 308 at the tip of each of the conductive posts 306. By placing the conductive post connects in row 329 of the mimic die 301 in a series connection, testing of the individual solder post connections is possible, while in contrast in the product die 102 (see FIG. 1A) these parallel conductive post connections cannot be individually tested.

Figure 3B:
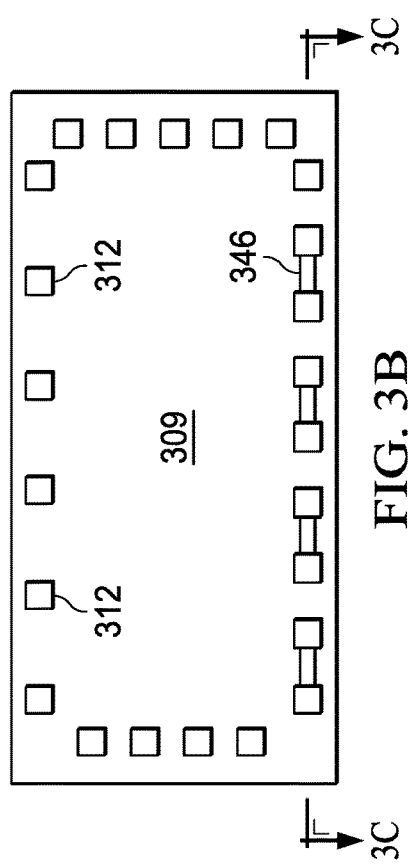
FIG. 3B is a plan view of a product mimic die and FIG. 3C is a cross sectional view.
Figure 3C:
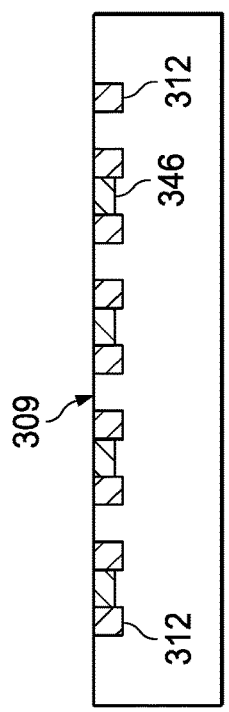

In summary, in the first daisy chain testing loop, the current flow is from the lead frame lead labeled 372 in FIG. 3A, through the selected conductive post connects 306 on the first mimic die 301, through selected lead frame 314 leads, and through the bond wires 322 to selected bond pads 312 in the second mimic die 309 connected by bondpad shorting bars 346, and to the lead frame lead labeled 370 (see FIGS. 3A-3C, and see dashed line 671 in FIG. 6, note that in FIG. 6 the bond wires 622 are part of the daisy chain testing loops, even though not marked with dashed lines, for clarity of illustration).

Figure 4:
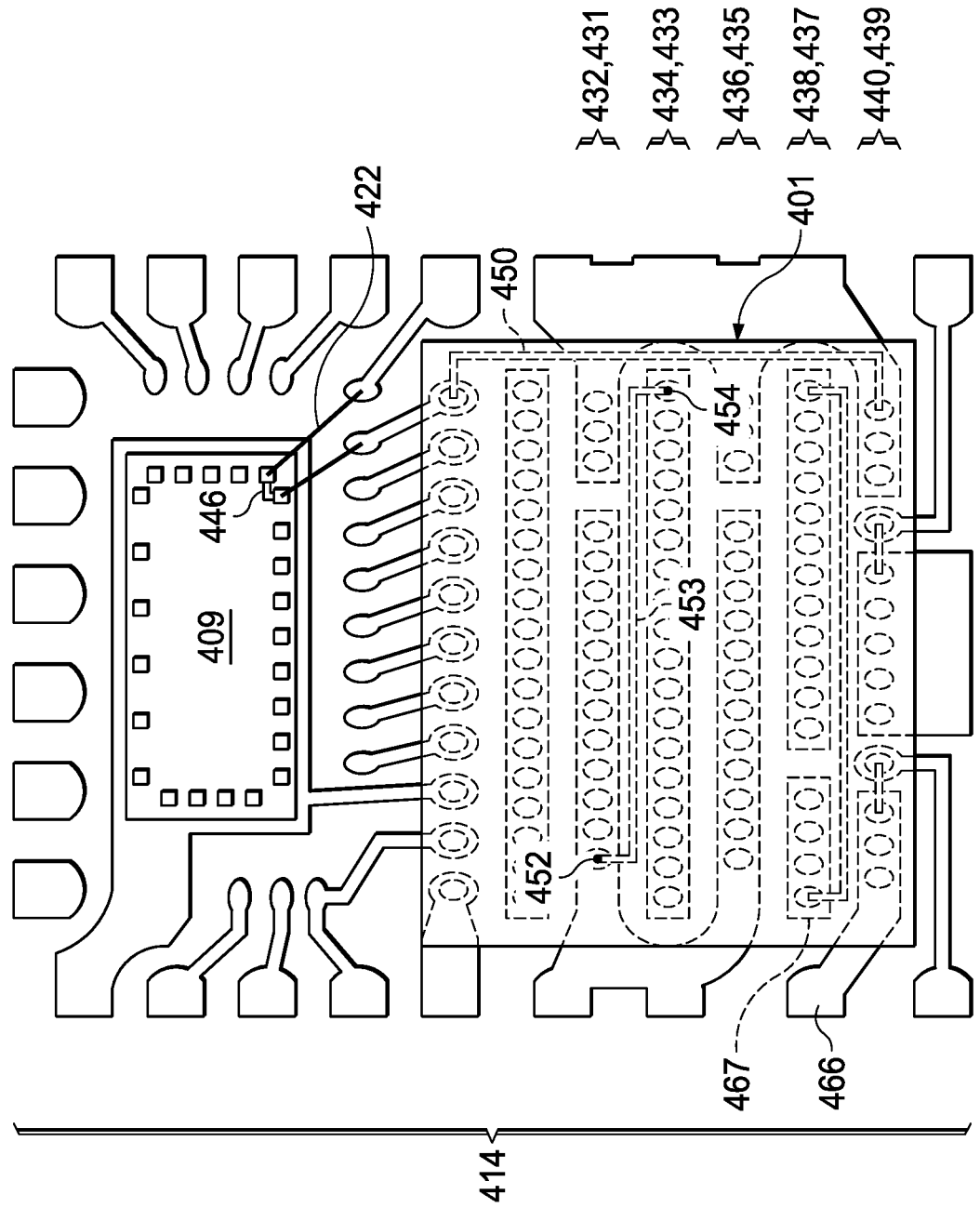
FIG. 4 is a plan view of product mimic dies and a lead frame with a second daisy chain testing loop.

FIG. 4 is another plan view similar to FIG. 3A including a lead frame 414 and mimic dies 401, corresponding to product die 102 in FIG. 1A, and die 409, corresponding to product die 110 in FIG. 1A. A second daisy chain testing loop is illustrated in FIG. 4. See the dashed line 675, FIG. 6, note that in FIG. 6 the daisy chain testing loops (675 and 671) include the bond wires 622 which are not marked with a dashed line. In FIG. 4 similar reference labels are used for similar elements as are shown in FIG. 1A-1C, for clarity. For example, lead frame 414 in FIG. 4 corresponds to lead frame 114 in FIG. 1A. This second daisy chain testing loop tests five conductive post connect rows (431, 433, 435, 437, 439 in FIG. 4) of conductive post connects 406 that are soldered to five lead frame extended conductive leads (labeled 432, 434, 436, 438, 440 in FIG. 4) on lead frame 414. In FIG. 6, the second daisy chain testing loop is shown by a dashed line 675, and including certain bond wires 622.

In the second daisy chain testing loop, the packaged product mimic die 401 in FIG. 4 (see also 501 in FIG. 5A) is mounted to conductive traces on a printed circuit board substrate, such as a burn-in board, to complete the second daisy chain testing loop. (See 556, FIG. 5C) In FIG. 5A, a plan view illustrates a mimic product package 524 mounted on a printed circuit board 556. The mimic product package 524 includes the mimic product die 509 and mimic product die 501 mounted to a lead frame 514 and packaged in the mimic product package 524. The mimic product package is mounted to printed circuit board 556 arranged with certain lead frame leads coupled to certain conductive circuit board traces to provide continuity through the second daisy chain testing loop. (See dashed line 675 in FIG. 6.)

Figure 5A:
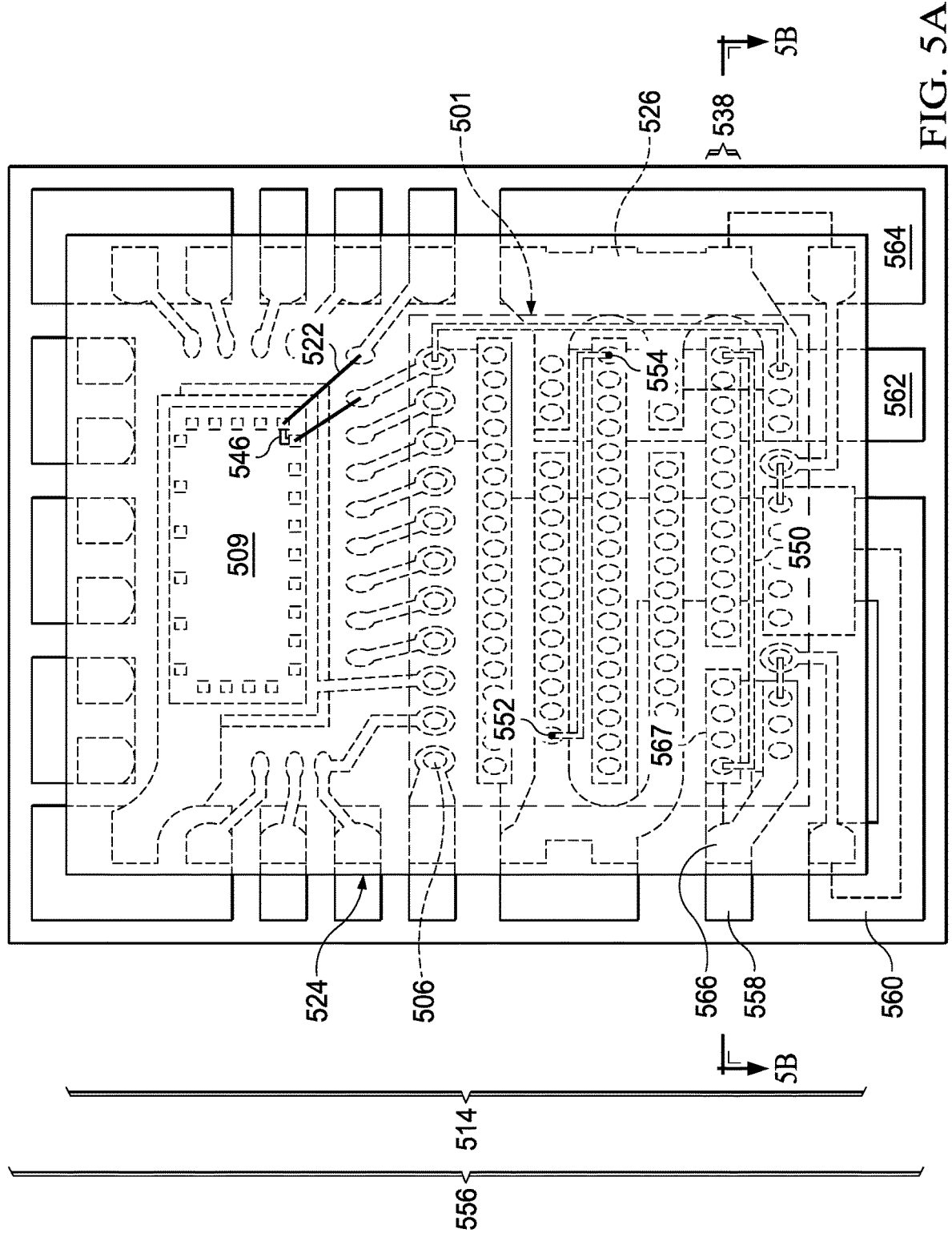
FIG. 5A is a plan view of a package with product mimic dies mounted on a burn-in board.
Figure 5B:
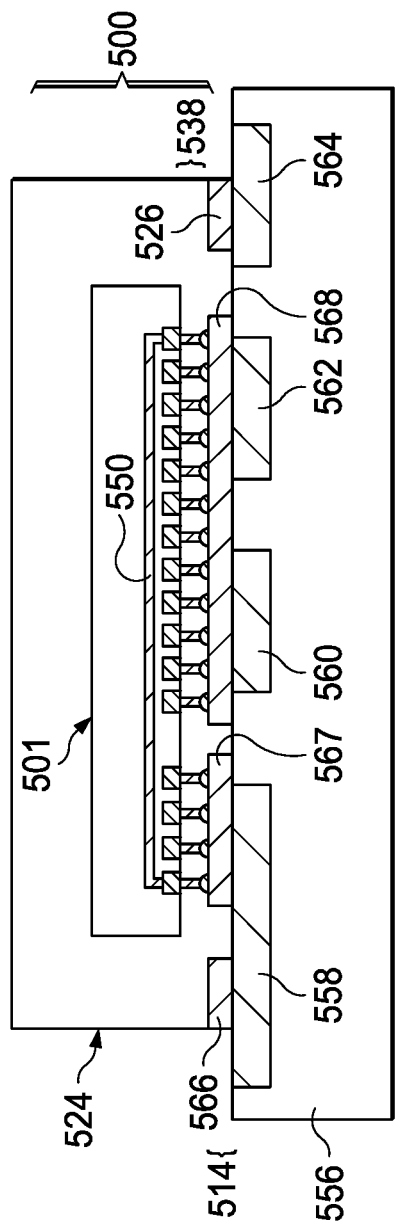
FIG. 5B is a cross sectional view through a portion of a daisy chain testing loop in FIG. 5A.
Figure 5C:
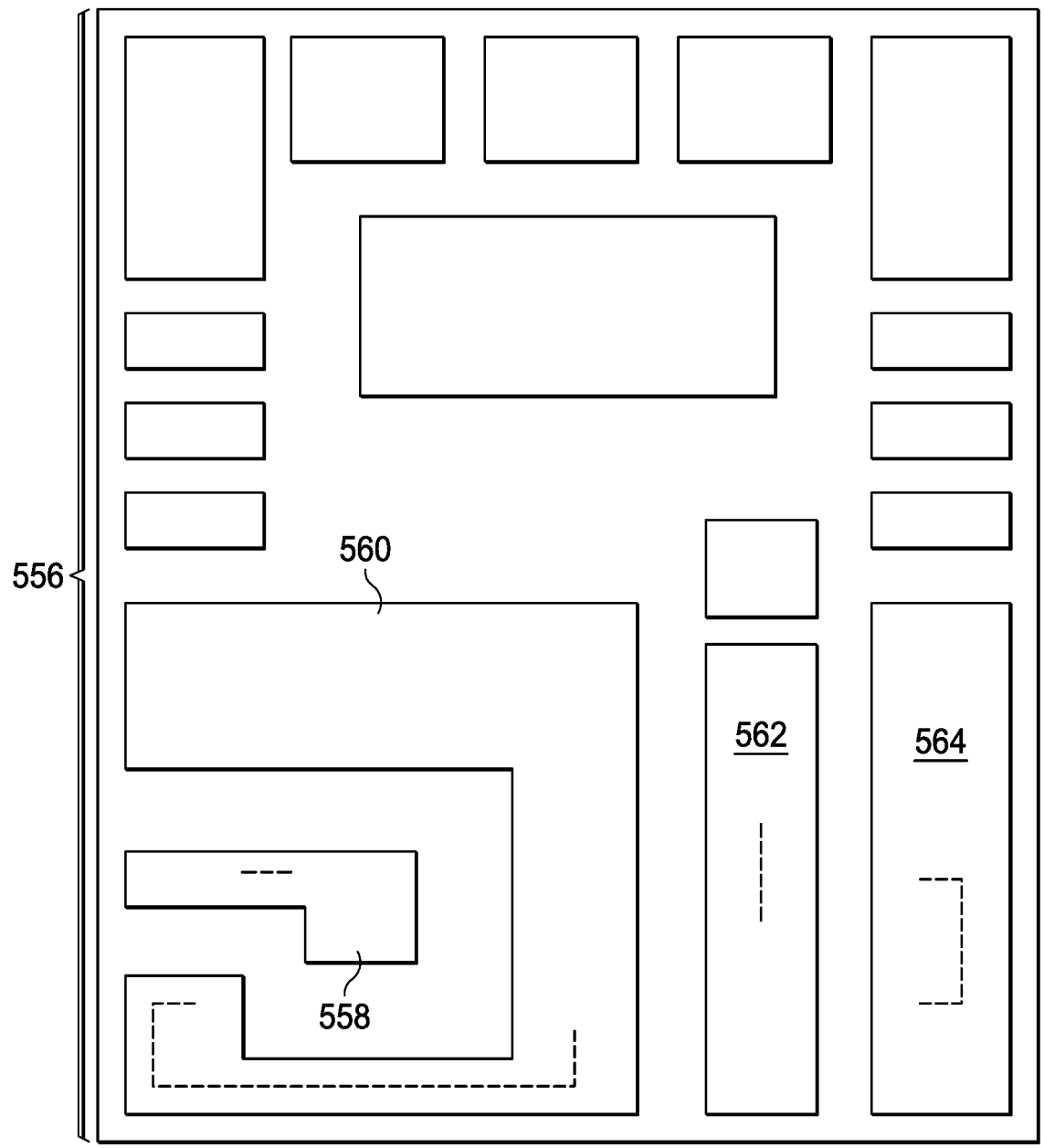
FIG. 5C is a plan view of the burn-in board.

FIG. 5C shows the conductive traces 558, 560, 562, and 564 in a substrate 556, such as a printed circuit board. These conductive traces provide continuity through the second daisy chain testing loop when the packaged mimic die 500 (see FIG. 5A) is mounted on printed circuit board 556. For example, trace 558 in FIG. 5C will provide an electrical path between lead frame leads 566 and 567 when the packaged mimic die 500 is mounted on the substrate 556. In FIG. 5C the dotted lines on substrate traces 558, 560, 562, and 564 indicate current paths in the second daisy chain testing loop.

FIG. 5A is a top down view of the packaged product mimic die 500 mounted on the printed circuit board 556. In FIGS. 5A and 5B similar reference labels are used for similar elements as are shown in FIG. 3A for clarity. For example, lead frame 514 in FIGS. 5A and 5B corresponds to lead frame 314 in FIG. 3A. FIG. 5B is a cross section through FIG. 5A taken along cut line 5B-5B. Multiple conductive post connects 506 in the row 538 in the first product mimic die 501 are bonded to extended conductive lead 568 on lead frame 514. A post connect shorting bar 550 connects, in series connection, the conductive post connect 506 that is bonded to extended conductive lead 568, to the conductive post connect 506 that is bonded to extended conductive lead 567 (see FIG. 5B), these conductive post connects were selected as being most likely to fail and therefore need reliability testing. Mold compound 524 covers the product mimic dies 501 and 509 and portions of the lead frame 514 including extended conductive lead frame leads 567 and 568, and lead frame leads 526 and 566, to form the mimic product package 500. Trace 558 on printed circuit board 556 provides the current path between lead frame leads 566 and 567 in the second daisy chain testing loop. (See FIG. 5B and see the dashed line on substrate trace 558 in FIGS. 5A and 5C, the dashed lines on the traces on the printed circuit board as shown in FIGS. 5A and 5C indicating regions of the traces that make connections for the second daisy chain testing loop.)

FIG. 6 is a top down view of the mimic product package 600 mounted on substrate 656, such as a printed circuit board with conductive traces used to complete the daisy chain testing loops. In FIG. 6 similar reference labels are used for similar elements as are shown in FIG. 5A, for clarity. The current path through the first daisy chain testing loop is indicated by dotted line 671, and includes shorting bars on mimic die 609 between bond pads, wire bonds between the mimic die 609 and the lead frame, and extending to the conductive post connects on mimic die 601, and continuing in series to the horizontal row of conductive post connects in series on mimic die 601. Daisy chain testing loop 1 starts at substrate trace 670 and ends at substrate trace 672. The current path through the second daisy chain testing loop is indicated by dotted line 675.

Daisy chain testing loop 2 starts at substrate trace 674 and ends at substrate trace 676 in FIG. 6. The second daisy chain testing loop includes traces such as 674 on the printed circuit board, and shoring bars such as 650 on the mimic product die 609, the shorting bars connect conductive post connects most likely to fail such as at 652 and 654, for example, in the series path, portions of the lead frame 614 and the bond wires 622 are also connected in the daisy chain testing loop 2, as is a shorting bar 646 between bond pads on the mimic die 609, and continuing to trace 676 on the printed circuit board. Daisy chain testing loops 1 and 2 are examples, of course many other arrangements could be used to place those conductive post connects that are most likely to fail in more or fewer daisy chain testing loops for BLR testing.

A mimic product package may contain only one product mimic die. In alternative arrangements, the mimic product package may contain several product mimic dies. A mimic product package or a product mimic die may contain only one daisy chain testing loop or may contain several daisy chain testing loops. The mimic product package and the product mimic die make it possible to test and debug the product package while product dies are being developed. Both the product package and the product dies can undergo multiple revisions prior to completion of the final designs.

Figure 7A:
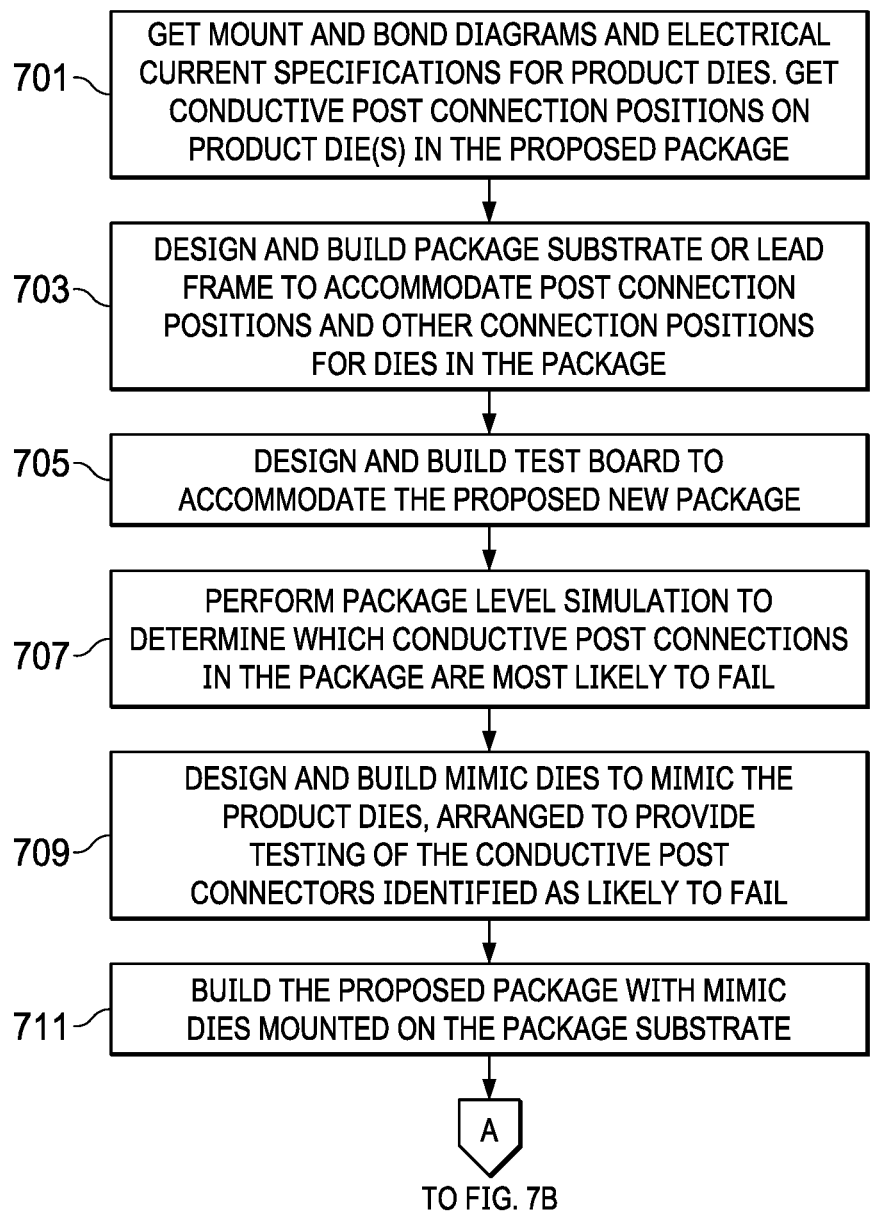
FIGS. 7A-7B (collectively, FIG. 7) illustrate a flow diagram for selected steps of a method for designing product mimic dies and for co-optimizing a product package for a product die in development.
Figure 7B:
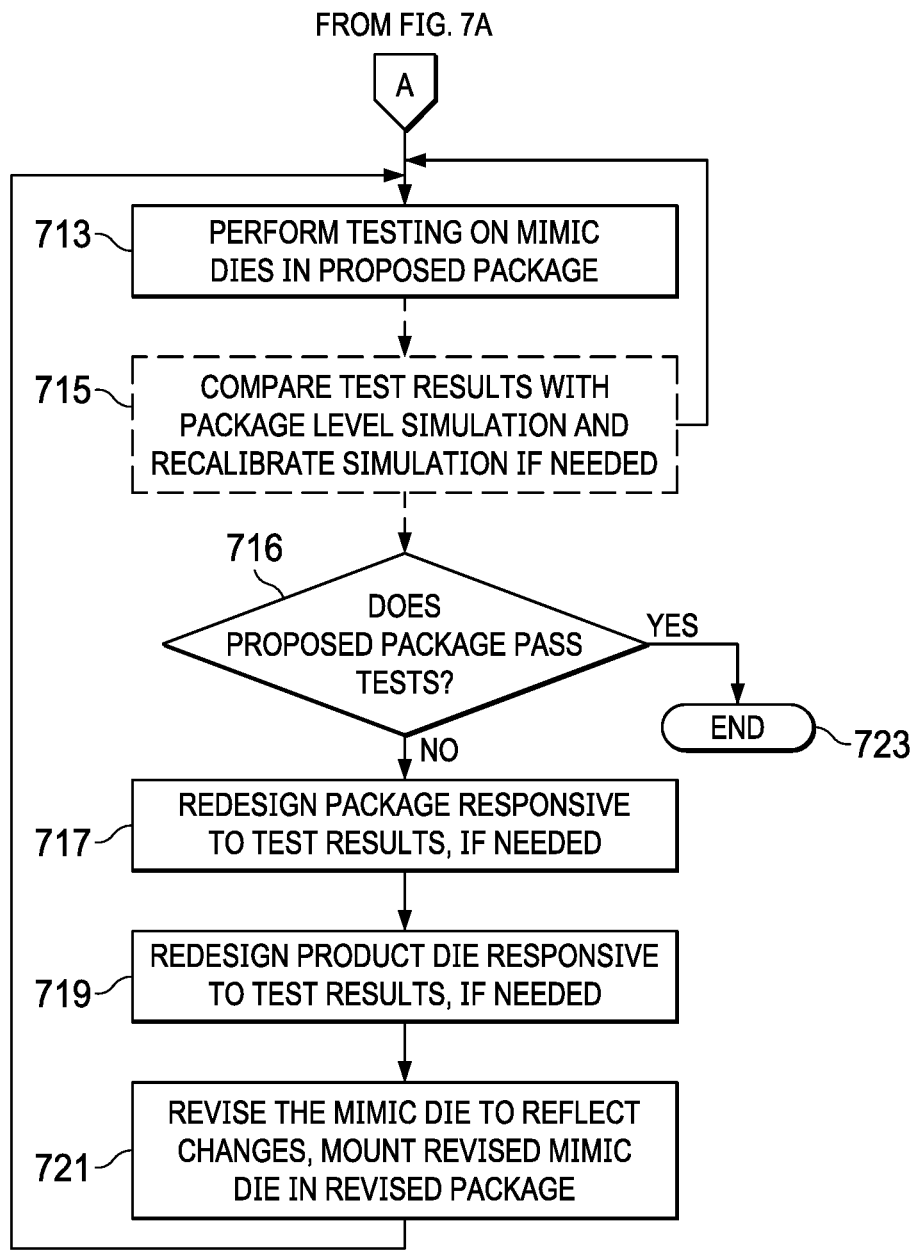

The procedure for developing the product package in parallel with development of a product die is described in the flow diagram in FIGS. 7A-7B (collectively, "FIG. 7.") The methods of the arrangements are applicable, for example, to a high power product die in a high power package, but can be applied to the design of packages for other product dies.

The first step 701 in FIG. 7A is obtain the mount and bond diagrams as well as the electrical current specifications for the product die(s) in development. The mount and bond diagrams provide the locations of all the product dies in the product package and also provide locations of all the conductive post connects between the product dies and the package substrate, for example a lead frame.

In step 703 the proposed package substrate, such as a lead frame on which the product die(s) are to be mounted, is designed.

In step 705 a new test board, for example a burn-in board, for the proposed packaged product is built to enable testing of board level reliability (BLR) testing.

In step 707 package level simulation is performed on the proposed product package design to determine the conductive post connect locations where the most heat is generated and to determine which of the conductive post connects are predicted to be most likely to fail first.

In step 709 product mimic dies are designed with selected ones of the conductive post connects wired in series so the proposed product package can be BLR tested using the product mimic dies. Multiple daisy chain testing loops may be needed to test all the conductive post connects that are predicted by the package level simulation to be most susceptible to failure. The product mimic dies are constructed to closely approximate the size and shape of the product dies so that the mimic product package testing will accurately predict the results that will be obtained with the completed product die. The product mimic dies are manufactured using the same techniques and materials as are used to manufacture the product dies.

In step 711 the product mimic t dies are mounted on the proposed package substrate, for example a lead frame, and are covered with mold compound to form the mimic product package including the product mimic die(s). This completes the proposed product package with the product mimic dies inside. The remaining steps are shown in FIG. 7B, following step 711 in FIG. 7A. Note that the order of steps in FIG. 7A-7B can be varied, and that some steps can be done in parallel and contemporaneously, for one example step 705 is independent from step 707 and can be done at any time or in any order with respect to other steps.

In FIG. 7B, steps are shown for an iterative process to complete the package and product die designs. At step 713 mimic product packages are mounted on printed circuit boards and are BLR tested using, for example, burn-in testing.

In step 715, an optional step, results of the tests are checked to see if results match the package level simulation predictions. If the tests do not match, the package level simulation is modified until new predictions are obtained that match the testing results. If the package level simulation is modified, the method can return to the testing at step 713 to confirm the new package simulation correctly predicts the actual results obtained in testing at step 713.

Step 716 is a decision step. If the proposed package passed the tests performed at step 713, the method ends at step 723 and the product die, the conductive post connect positions, the package substrate design, and the package design are complete. If the proposed package fails the tests, the method continues to step 717.

In step 717 the test results are analyzed to determine if modifications to the product package are required. In addition, in step 719 an analysis is made to determine if modification needs to be made to the product die to resolve a potential packaged product die reliability problem. For example, it may be decided to relocate some of the conductive post connects to reduce current flow through one region of the package.

If it is determined in step 719 that conductive post connect positions or other modifications to the product die are needed, the package features such as the lead frame and the mimic product die are modified in step 721 to co optimize the revised product die design with the product package design.

Based upon the results of the first BLR testing, the package design can be revised, the product dies and if needed the mimic product die design can also be revised in step 721. Revised product mimic dies can be manufactured, packaged, mounted on the test boards and returned to step 713 for additional testing.

Steps 713 through 721 can be repeated until a reliable package for a product die is achieved, and test results with the product mimic die indicates the finished packaged device will pass board level reliability testing when the product die are qualified. When step 716 establishes the proposed package with the product mimic dies passes the BLR tests, the method ends at step 723 with the completed package design ready for the product dies.

This method ensures that a reliable product package is waiting for the product dies when the product dies pass qualification. Upon qualification, product dies can be packaged in the product package and the packaged product dies can be submitted for testing with high confidence that the product packages will pass board level reliability (BLR) testing without failures and without the need for redesign of the package, or the of the product dies, due to failures in BLR testing.

Modifications are possible in the described arrangements, and other alternative arrangements are possible within the scope of the claims.

What is claimed is:

1. A method, comprising:
   providing a product package for a product die;
   building a product mimic die that mimics the product die and which is configured to make the product package functional for use in reliability testing, wherein the mimic die includes a daisy chain testing loop;
   packaging the product mimic die in the product package to form a mimic product package;
   reliability testing the mimic product package;
   responsive to the reliability testing, revising the product package; and
   repeating the steps of reliability testing and revising the product package until the product package passes the reliability tests.

2. The method of claim 1, wherein the product die has multiple parallel electrical connections to the product package and wherein the product mimic die connects at least two of these multiple parallel electrical connections in series.

3. The method of claim 2, wherein the multiple parallel electrical connections are conductive post connects.

4. The method of claim 1, wherein during the reliability testing, more than one ampere of current flows through a conductive post connect coupling the product die to the product package.

5. The method of claim 1, further comprising:
   the product package configured for the product die and for a second product die;
   building a second product mimic die that mimics the second product die;
   packaging the product mimic die and the second product mimic die in the product package to form a mimic multi-die product package; and
   reliability testing the mimic multi-die product package.

6. The method of claim 1, further comprising:
   responsive to the reliability testing, revising the product die;
   revising the product mimic die to correspond to the revised product die;
   building a revised product mimic die; and
   repeating the reliability testing and revising steps for the revised mimic product package until the revised mimic product package passes testing.

7. The method of claim 6, wherein the product die has multiple parallel electrical connects between the product die and a package substrate in the product package.

8. The method of claim 1, further comprising responsive to the reliability testing, revising a manufacturing flow of the product die.

9. The method of claim 1, wherein:
   the product die has at least one set of parallel electrical connections to the product package; and
   the product mimic die couples at least two of the parallel electrical connections in the at least one set in series to form a daisy chain testing loop.

10. The method of claim 9, wherein the parallel electrical connections further comprise conductive post connects.

11. The method of claim 1, further comprising:
   the product die has at least two sets of parallel electrical connections to the product package;
   the product mimic die connects at least two of the parallel electrical connections from a first set in series to form a first daisy chain testing loop; and the product mimic die connects at least two of the parallel electrical connections from a second set in series to form a second daisy chain testing loop.

12. The method of claim 11, wherein the parallel electrical connections are conductive post connects.

13. The method of claim 1, wherein the product die has multiple parallel electrical connects between the product die and a package substrate in the product package.

14. A method, comprising:
providing a product package for a product die that has multiple parallel electrical connects between the product die and a package substrate in the product package;
performing a package level simulation on the product package to determine which of the parallel electrical connects between the product die and the package are most susceptible to failure during board level reliability (BLR) testing;
coupling at least some of the determined parallel electrical connects most susceptible to failure in series to form a daisy chain testing loop;
providing a product mimic die that mimics the product die and includes the daisy chain testing loop, the product mimic die configured to make the product package functional for reliability testing;
packaging the product mimic die in the product package to form a mimic product package;
reliability testing the mimic product package;
responsive to the reliability testing, revising the product package; and
repeating the reliability testing and revising steps for the product package until it passes the reliability testing.

15. The method of claim 14, further comprising:
comparing reliability testing results with package level simulation predictions; and
if a difference between reliability testing results and package level simulation predictions exceeds a predetermined specification, modifying the package level simulation until the difference between test results and package level simulation predictions no longer exceeds the predetermined specification.

16. The method of claim 14, further comprising:
providing the product package which is a multi-die product package where the multi-die product package includes the product die and a second product die;
building a second product mimic die that mimics the second product die;
packaging the product mimic die and the second product mimic die in the multi-die product package to form a mimic multi-die product package; and
reliability testing the mimic multi-die product package.

17. The method of claim 14, further comprising:
building a testing board for the product package;
configuring a daisy chain testing loop where a lead on the testing board provides continuity for a daisy chain testing loop; and
building the product mimic die with the daisy chain testing loop that includes the lead.

18. A method, comprising:
providing a product package for a product die;
building a product mimic die that mimics the product die and which is configured to make the product package functional for use in reliability testing, wherein the mimic die includes a daisy chain testing loop;
packaging the product mimic die in the product package to form a mimic product package;
testing the mimic product package;
responsive to the testing, revising the product package; and
repeating the steps of testing and revising the product package until the product package passes the tests.

19. The method of claim 18, wherein the product die has multiple parallel electrical connections to the product package and wherein the product mimic die connects at least two of these multiple parallel electrical connections in series.

20. The method of claim 19, wherein the multiple parallel electrical connections are conductive post connects.

21. The method of claim 18, wherein the testing is reliability testing.

22. The method of claim 21, further including responsive to the reliability testing, revising the product package.

23. The method of claim 18, wherein the product die has multiple parallel electrical connects between the product die and a package substrate in the product package.

24. The method of claim 18, wherein the product die has multiple parallel electrical connects between the product die and a package substrate in the product package.

* * * * *